United States Patent
Yamani et al.

(10) Patent No.: US 12,378,467 B2
(45) Date of Patent: Aug. 5, 2025

(54) TRACER INCLUDING ZINC OXIDE QUANTUM DOTS EMBEDDED IN SILICA

(71) Applicants: Saudi Arabian Oil Company, Dhahran (SA); King Fahd Univerisity of Petroleum & Minerals, Dhahran (SA)

(72) Inventors: Zain H. Yamani, Dhahran (SA); Safyan A. Khan, Dhahran (SA); Shahid Ali, Dhahran (SA); Mohammed Al-Jabari, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 741 days.

(21) Appl. No.: 16/672,478

(22) Filed: Nov. 3, 2019

(65) Prior Publication Data
US 2021/0130681 A1    May 6, 2021

(51) Int. Cl.
| | |
|---|---|
| *E21B 47/11* | (2012.01) |
| *C01G 9/02* | (2006.01) |
| *C09K 8/60* | (2006.01) |
| *C09K 11/02* | (2006.01) |
| *C09K 11/54* | (2006.01) |
| *E21B 43/34* | (2006.01) |
| *B82Y 15/00* | (2011.01) |

(Continued)

(52) U.S. Cl.
CPC .............. *C09K 11/02* (2013.01); *C01G 9/02* (2013.01); *C09K 8/60* (2013.01); *C09K 11/54* (2013.01); *E21B 47/11* (2020.05); *B82Y 15/00* (2013.01); *B82Y 20/00* (2013.01); *B82Y 40/00* (2013.01); *C01P 2004/03* (2013.01); *C01P 2004/04* (2013.01); *C01P 2004/64* (2013.01); *C01P 2006/60* (2013.01)

(58) Field of Classification Search
CPC .......... E21B 47/11; E21B 43/34; C09K 11/02
USPC ..................................... 166/250.12
See application file for complete search history.

(56) References Cited

U.S. PATENT DOCUMENTS

| | | | |
|---|---|---|---|
| 10,702,843 B2 * | 7/2020 | Suresh ................ | C09K 8/665 |
| 2012/0318503 A1 | 12/2012 | Kanj et al. | |

(Continued)

FOREIGN PATENT DOCUMENTS

| | | |
|---|---|---|
| EP | 2542759 | 1/2013 |
| EP | 3149103 | 4/2017 |

OTHER PUBLICATIONS

Al-Jabari, "Development of Quantum Dots Based Nano-Agents for Residual Oil Sensing, " Dissertation Presented to the Deanship of Graduate Studies in Partial Fulfillment of the Requirements for the Degree of Doctor of Philosophy in Chemistry, King Fahd University of Petroleum & Minerals, Dhahran, Saudi Arabia, Dec. 2015, 204 pages.

(Continued)

*Primary Examiner* — William D Hutton, Jr.
*Assistant Examiner* — Ashish K Varma
(74) *Attorney, Agent, or Firm* — Fish & Richardson P.C.

(57) ABSTRACT

A composition includes a continuous phase, a silica nanoparticle, methyl groups, and a quantum dot. The continuous phase includes ethanol or water. The silica nanoparticle has a diameter of less than 100 nanometers. The methyl groups are disposed on a surface of the silica nanoparticle. The quantum dot includes zinc oxide. The quantum dot is embedded in the silica nanoparticle.

16 Claims, 20 Drawing Sheets

(51) Int. Cl.
  *B82Y 20/00*  (2011.01)
  *B82Y 40/00*  (2011.01)

(56) References Cited

U.S. PATENT DOCUMENTS

| | | | | |
|---|---|---|---|---|
| 2013/0200299 | A1* | 8/2013 | Mazyar | C09K 5/14 977/734 |
| 2016/0177698 | A1* | 6/2016 | Schultheiss | E21B 49/00 166/250.1 |
| 2016/0376492 | A1* | 12/2016 | Chakraborty | E21B 43/16 166/267 |
| 2017/0022804 | A1* | 1/2017 | Gupta | E21B 47/11 |
| 2019/0299184 | A1* | 10/2019 | Suresh | C09K 8/03 |
| 2022/0250933 | A1* | 8/2022 | Ippen et al. | C01G 9/02 |

OTHER PUBLICATIONS

Abdullah et al., "Application of Radioactive and Chemical Tracers for Offshore WAG Pilot Project," in SPE Enhanced Oil Recovery Conference, Society of Petroleum Engineers, SPE143391, Jul. 19-21, 2011, 17 pages.

Agenet, "Fluorescent Nanobeads: A New Generation of Easily Detectable Water Tracers," in Inthernational Petroleum Technology Conference, International Petroleum Technology Conference, Jun. 12-14, 2011, 13 pages.

Al-Murayri et al., "Design of a Partitioning Interwell Tracer Test for a Chemical EOR Pilot Targeting the Sabriyah Mauddud Carbonate Reservoir in Kuwait," in SPE Kuwait Oil and Gas Show and Conference, Society of Petroleum Engineers, SPE-187549-MS, Oct. 15-18, 2017, 9 pages.

Chuang et al., "Ultra-sensitive in-situ detection of near-infrared persistent luminescent tracer nanoagents in crude oil-water mixtures," Science Reports, vol. 6, 27993, 2016, 6 pages.

Cubillos et al., "Integrated Approach—Key for Successful Interwell Tracer Project," Offshore Mediterranean Conference, Mar. 28-30, 2007, 12 pages.

Kosynkin and Alaskar, "Oil Industry First Interwell Trial of Reservoir Nanoagent Tracers," in SPE Annual Technical Conference and Exhibition, Society of Petroleum Engineers, SPE-181551-MS, Sep. 26-28, 2016, 15 pages.

Murugesan et al., "Carbon Quantum Dots Fluorescent Tracers for Production and Well Monitoring," SPE Annual Technical Conference and Exhibition in Dubai, UAE, SPE-181503-MS, Sep. 26-28, 2016, 8 pages.

Sanni et al., "Reservoir Description Insights from an Inter-Well Chemical Tracer Test," in SPE Kingdom of Saudi Arabia Annual Technology Symposium and Exhibition, Society of Petroleum Engineers, SPE-188060-MS, Apr. 24-27, 2017, 13 pages.

Serres-Piole et al., "Water tracers in oilfield applications: Guidelines," Journal of Petroleum Science and Engineering, 98-99, 22-39, 2012, 18 pages.

Spillker et al., "Characterizing Tracer Applicability in Different Mineralogy," in SPE Improved Oil Recovery Conference, Society of Petroleum Engineers, Apr. 11-13, 2016, 23 pages.

Yamani et al., "Colloidal Solution of Luminescent ZnO Quantum Dots Embedded Silica as Nano-Tracers for Remote Sensing Application," Journal of Molecular Liquids, vol. 274, 447-454, 2019.

* cited by examiner

TRACER INCLUDING ZINC OXIDE QUANTUM DOTS EMBEDDED IN SILICA

TECHNICAL FIELD

This disclosure relates to tracers in oilfield applications.

BACKGROUND

Tracers can be used to qualitatively or quantitatively gauge how fluid flows through a subterranean formation. Tracers can be useful tools for estimating residual oil saturation. Tracers can be used in inter-well tests or single well tests. In inter-well tests, the tracer can be injected at an injection well along with a carrier fluid and detected at a producing well after some period of time, which can be anything from days to years. In single well tests, the tracer can be injected into the formation from a well and then produced out of the same well. Tracers can be radioactive or chemical and can include gas, liquid, solid, or any combination of these.

SUMMARY

In a first general aspect, zinc acetate dihydrate is dissolved in ethanol to form a first solution. Lithium hydroxide is mixed with the first solution to form a first mixture. The first mixture is stirred to form zinc oxide quantum dots.

In a second general aspect, a tracer fluid is obtained. The tracer fluid includes a silica nanoparticle having a diameter of less than 100 nanometers. The tracer fluid includes methyl groups disposed on a surface of the silica nanoparticle. The tracer fluid includes a quantum dot including zinc oxide. The quantum dot is embedded in the silica nanoparticle. The tracer fluid is introduced to a subterranean formation. The tracer fluid is tracked within the subterranean formation.

In a third general aspect, a composition includes a continuous phase, a silica nanoparticle, methyl groups, and a quantum dot. The continuous phase includes ethanol or water. The silica nanoparticle has a diameter of less than 100 nanometers. The methyl groups are disposed on a surface of the silica nanoparticle. The quantum dot includes zinc oxide. The quantum dot is embedded in the silica nanoparticle.

The first, second, and third general aspects, either alone or in combination, can include one or more of the following features.

In some implementations, the zinc oxide quantum dots are separated from a remaining portion of the first mixture. The zinc oxide quantum dots can be dispersed in ethanol to form a first colloidal dispersion.

In some implementations, cetryltrimethylammonium bromide is mixed with water to form a micelle solution. The first colloidal dispersion can be mixed with the micelle solution to form a second mixture. The second mixture can be mixed with a solution including sodium hydroxide to form a third mixture. The third mixture can be mixed with ethyl acetate to form a fourth mixture. The fourth mixture can be mixed with tetraethylorthosilicate, dimethyldiethoxysilane, or a combination of both to form a fifth mixture. The fifth mixture can be stirred to form silica nanoparticles embedded with zinc oxide quantum dots.

In some implementations, the silica nanoparticles are separated from a remaining portion of the fifth mixture. The silica nanoparticles can be dispersed in a continuous phase that includes ethanol or water to form a second colloidal dispersion.

In some implementations, the first mixture is diluted with ethanol before the first mixture is stirred.

In some implementations, the first mixture is stirred for about 2 hours.

In some implementations, the first mixture including the zinc oxide quantum dots, after stirring, has a potential of hydrogen (pH) in a range of from about 8 to about 9.

In some implementations, mixing cetyltrimethylammonium bromide with water includes dissolving the cetyltrimethylammonium bromide in water while stirring.

In some implementations, mixing the first colloidal dispersion with the micelle solution includes mixing the first colloidal dispersion with the micelle solution while stirring, and the second mixture is stirred for about 10 minutes.

In some implementations, the solution including sodium hydroxide has a sodium hydroxide concentration of about 13 millimoles per liter.

In some implementation, mixing the fourth mixture with tetraethylorthosilicate, dimethyldiethoxysilane, or a combination of both includes mixing the fourth mixture with tetraethylorthosilicate and dimethyldiethoxysilane while stirring, and the fifth mixture is stirred for about 12 hours.

In some implementations, a molar ratio of tetraethylorthosilicate to dimethyldiethoxysilane that is mixed with the fourth mixture is about 1:2.

In some implementations, tracking the tracer fluid includes measuring a luminescence of the quantum dot embedded in the silica nanoparticle while the tracer fluid is within the subterranean formation.

In some implementations, the composition includes multiple silica nanoparticles. Methyl groups can be disposed on a surface of each of the silica nanoparticles. A quantum dot including zinc oxide can be embedded in each of the silica nanoparticles. Each of the silica nanoparticles can have diameters in a range of from about 40 nanometers to about 60 nanometers.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
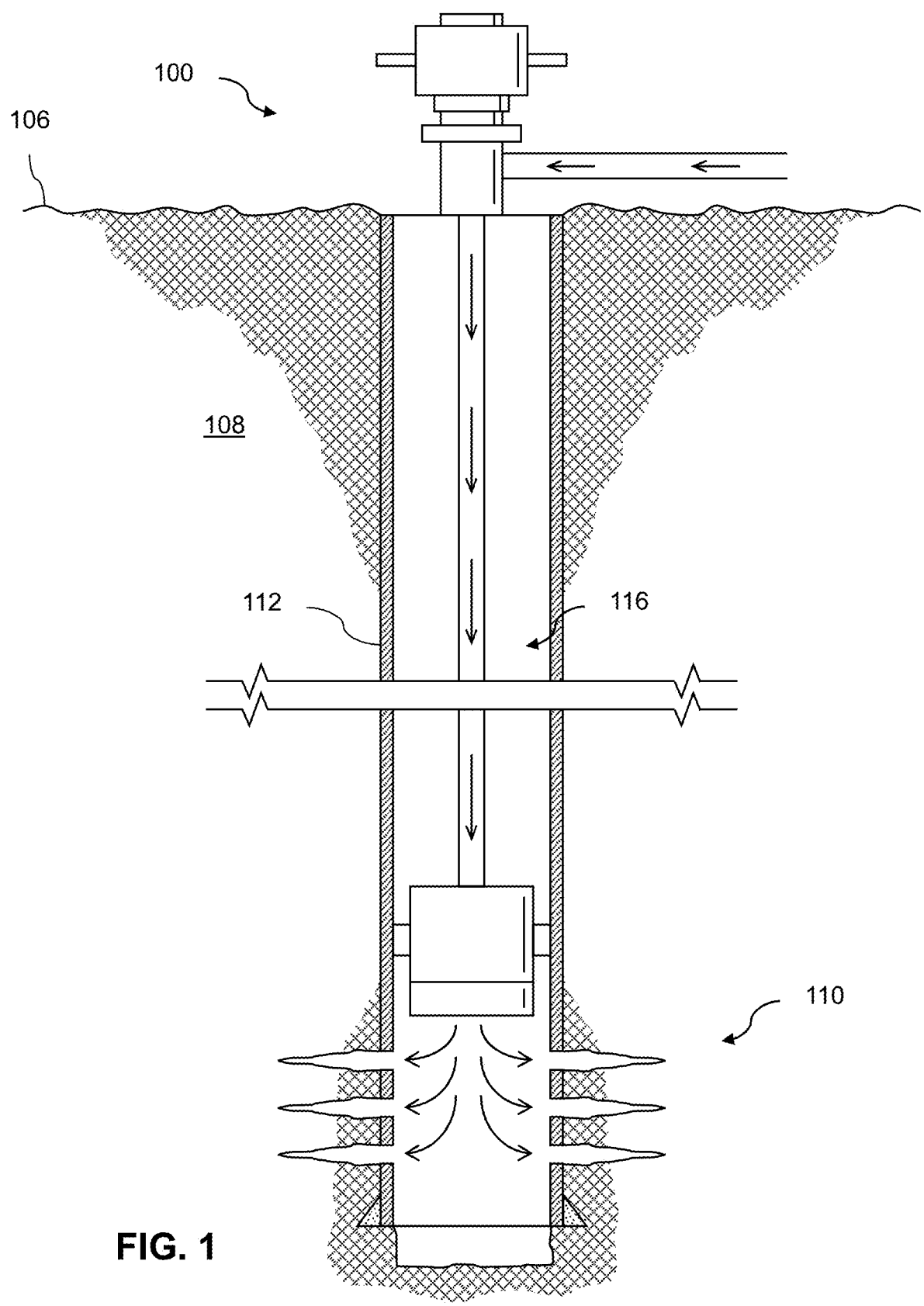
FIG. 1 is a schematic diagram of an example well.

This disclosure describes silica nanoparticles embedded with zinc oxide quantum dots. These silica nanoparticles including the zinc oxide quantum dots can be implemented as tracers in oilfield applications. Quantum dots are tiny semiconductor particles that are a few nanometers in size, having optical and electronic properties that differ from larger particles due to quantum mechanics. When the quantum dots are illuminated by ultraviolet light, an electron in the quantum dot can be excited to a state of increased energy. When the electron drops back to its valence band, it releases its energy in the form of light. Quantum dots can therefore luminesce. As used in this disclosure, the term "nanoparticle" is used to include particles that have diameters less than 1 micrometer (μm). For example, nanoparticles have diameters of 999 nanometers (nm) or less. In some implementations, the nanoparticles have diameters of less than 100 nanometers. In some implementations, the zinc oxide quantum dots have an average diameter of about 5 nm. The zinc oxide quantum dots can be treated with tetraethyl orthosilicate (TEOS), dimethyldiethoxysilane (DIVIDES), or a combination of both to prepare the silica nanoparticles embedded with the zinc oxide quantum dots.

The presence of zinc oxide quantum dots can impart luminescence to the silica nanoparticles. Oxygen and hydroxide groups can be disposed on the surfaces of the silica nanoparticles. The presence of oxygen and hydroxide groups allow for hydrogen bonding that can impart hydrophilicity to the silica nanoparticles. The oxygen and hydroxide groups can originate, for example, from the TEOS. Methyl groups can be disposed on the surfaces of the silica nanoparticles. The presence of methyl groups can impart at least partial hydrophobicity to the silica nanoparticles. The methyl groups can originate, for example, from the DIVIDES. The silica nanoparticles embedded with zinc oxide quantum dots can be dispersed in a continuous phase, including ethanol or water, to form a colloidal dispersion. The colloidal dispersion can be implemented as a tracer fluid, which can be introduced to a subterranean formation.

The luminescence of the silica nanoparticles including the zinc oxide quantum dots can be measured within the subterranean formation to track fluid flow within the subterranean formation. In some implementations, the silica nanoparticles including the zinc oxide quantum dots can fluoresce in a region ranging from green to yellow.

Tracer can be injected into a well, for example, to enhance crude oil recovery in reservoirs. Inter-well tracer testing can be implemented for reservoir management. Knowledge of flow patterns, inter-well connections, and permeability can be useful in reservoir characterization. Radioactive tracers are commonly used in inter-well tests. Radioactive tracers, although typically easy to detect in small quantities, typically exhibit short half-lives, which can make them undesirable for waterflood projects, for example, in offshore reservoirs with large inter-well distances. For example, radioactive bromine has a half-life of about 36 hours, and tracers including radioactive bromine can decay to an undetectable level by the time they diffuse to a production well. Furthermore, special authorization is required from relevant regulatory bodies to transport such radioactive materials by land, sea, or air, and only certified staff are expected to handle all safety aspects necessary for transportation. Moreover, the usage of such radioactive tracers has become more restricted due to various concerns, such as increasing environmental issue and additional requirements of costly and oftentimes inconvenient on-site analysis.

The subject matter described in this disclosure can be implemented in particular implementations so as to realize one or more of the following advantages. The silica nanoparticles embedded with zinc oxide quantum dots can be chemically and physically stable in harsh reservoir environments, such as in salt concentrations of at least 20 grams per liter (g/L) and temperatures of at least 100 degrees Celsius (° C.). Embedding zinc oxide quantum oxides in silica nanoparticles can protect the quantum dots from such harsh reservoir environments. Silica nanoparticles are optically transparent and also exhibit beneficial physico-chemical and mechanical properties, for example, with regards to oilfield applications. Furthermore, the use of silica nanoparticles can allow for surface property control and functionality control to develop tracers, for example, with partitioning properties between oil and water phases. Silica nanoparticles can be modified during synthesis or post-synthesis reactions, for example, through biotin-, amino-, thio-, or carboxyl-functionalized silanes. The silica nanoparticles including the zinc oxide quantum dots can be implemented in similar applications as molecular tracers, but relatively simpler (and portable) spectrometers can be used to detect the luminescence of the silica nanoparticles. Implementing the silica nanoparticles including the zinc oxide quantum dots as tracer in a well can be more convenient and require the use of simpler tools in comparison to some traditional tracers, for example, radioactive tracers.

FIG. 1 depicts an example well 100 constructed in accordance with the concepts herein. The silica nanoparticles embedded with zinc oxide quantum dots can, for example, be introduced to the well 100 as tracer material. The well 100 extends from the surface 106 through the Earth 108 to one more subterranean zones of interest 110 (one shown). The well 100 enables access to the subterranean zones of interest 110 to allow recovery (that is, production) of fluids to the surface 106 (represented by flow arrows in FIG. 1) and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other suitable types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1 shows well 100 being produced with a Christmas tree attached to the wellhead. The Christmas tree includes valves used to regulate flow into or out of the well 100. The well 100 can includes a system residing in the wellbore, for example, at a depth that is nearer to subterranean zone 110 than the surface 106. The system, being of a type configured in size and robust construction for installation within a well 100, can include any type of rotating equipment that can assist production of fluids to the surface 106 and out of the well 100 by creating an additional pressure differential within the well 100. For example, the system can include a pump, compressor, blower, or multi-phase fluid flow aid.

In particular, casing 112 is commercially produced in a number of common sizes specified by the American Petroleum Institute (the "API"), including 4½, 5, 5½, 6, 6⅝, 7, 7⅝, 7¾, 8⅝, 8¾, 9⅝, 9¾, 9⅞, 10¾, 11¾, 11⅞, 13⅜, 13½, 13⅝, 16, 18⅝, and 20 inches, and the API specifies internal diameters for each casing size. The system can be configured to fit in, and in certain instances, seal to the inner diameter of one of the specified API casing sizes. Of course, the system can be made to fit in and, in certain instances, seal to other sizes of casing or tubing or otherwise seal to a wall of the well 100.

Figure 2A:
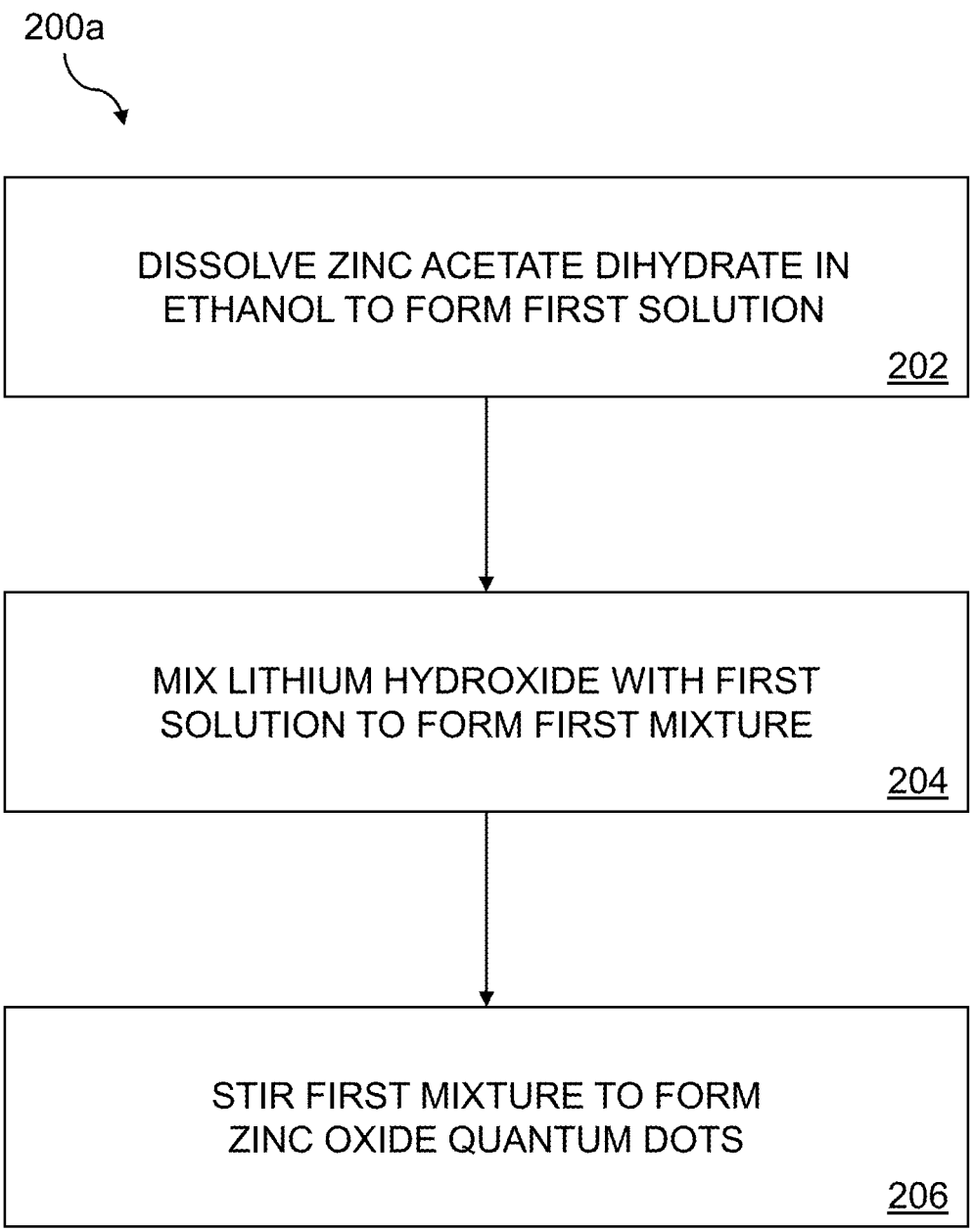
FIG. 2A is a flow chart of an example method that can be implemented to form zinc oxide quantum dots.

FIG. 2A is a flow chart of an example method 200a that can be implemented to form zinc oxide quantum dots. In some implementations, method 200a does not require any heating or dehydration of any of the precursors. At step 202, zinc acetate dihydrate ($Zn(OAc)_2 \cdot 2H_2O$) in ethanol to form a first solution. For example, 0.2 millimoles (mmol) of $Zn(OAc)_2 \cdot 2H_2O$ can be dissolved in 20 milliliters (mL) of ethanol to form the first solution. In some implementations, the first solution can be mixed at ambient temperature for about 30 minutes.

At step 204, lithium hydroxide (LiOH) is mixed with the first solution to form a first mixture. For example, 6.0 milligrams (mg) of LiOH can be added to the first solution to form the first mixture. In some implementations, the first mixture can be diluted with ethanol. For example, ethanol can be added to the first mixture to double the total volume of the mixture (such as a total volume of 40 mL).

At step 206, the first mixture is stirred to form zinc oxide quantum dots. For example, the first mixture can be stirred in a flask at 150 revolutions per minute (rpm) for about 2 hours. In some implementations, the resulting solution including the formed zinc oxide quantum dots has a potential of hydrogen (pH) in a range of from about 8 to about 9 (for example, 8.4).

In some implementations, the zinc oxide quantum dots formed at step 206 are separated from a remaining portion of the first mixture. For example, the first mixture (after step 206) can be centrifuged at 22,000 rpm for about 1 hour. The zinc oxide quantum dots can then be washed, for example, with ethanol. The zinc oxide quantum dots can be re-dispersed in ethanol for storage.

Figure 2B:
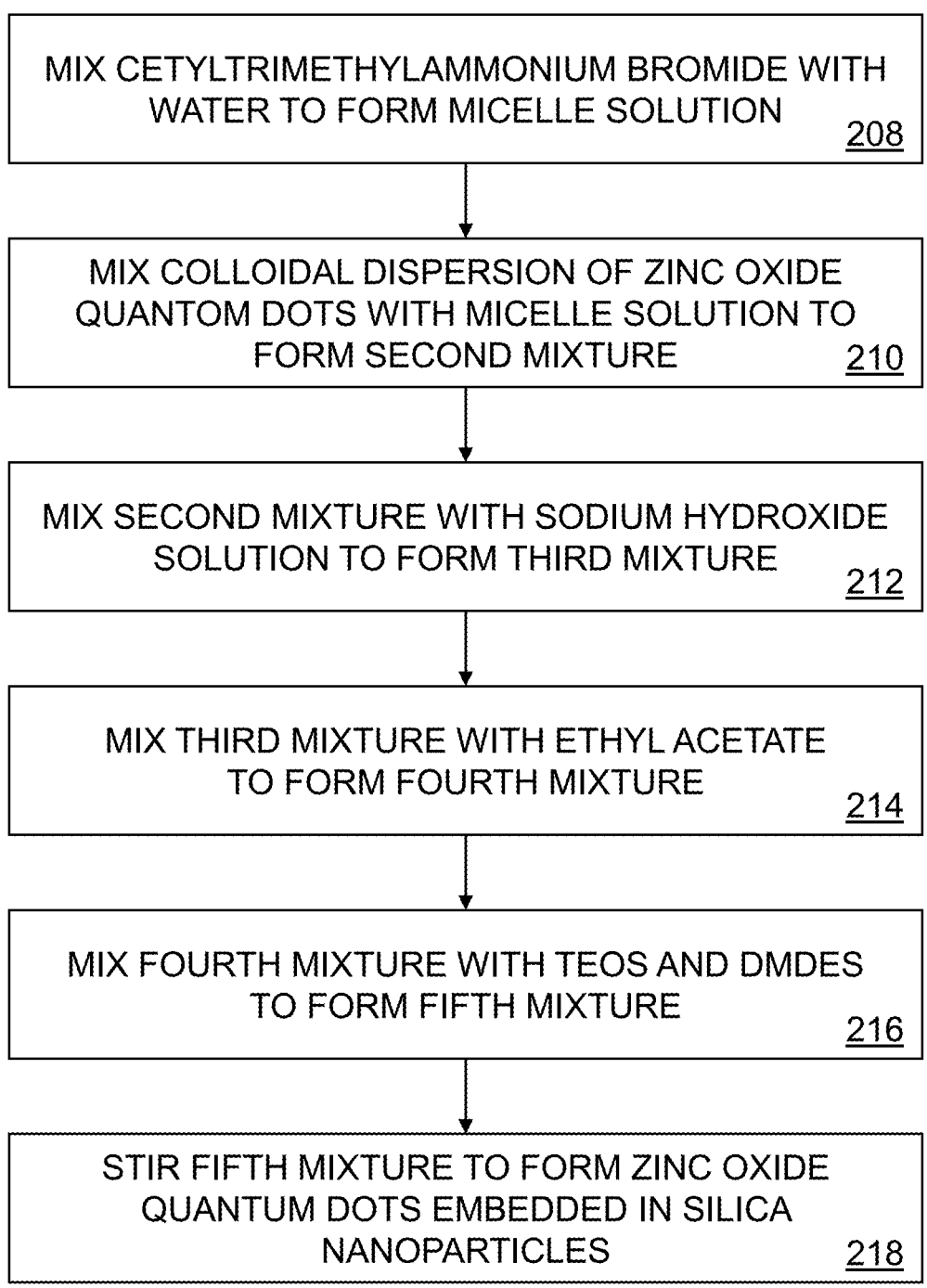
FIG. 2B is a flow chart of an example method that can be implemented to embed zinc oxide quantum dots in silica nanoparticles.

FIG. 2B is a flow chart of an example method 200b that can be implemented to embed zinc oxide quantum dots in silica nanoparticles. The zinc oxide quantum dots can be encapsulated within silica nanoparticles. In some implementations, zinc oxide quantum dots are also disposed on the surfaces of some or all of the silica nanoparticles. In some implementations, method 200b is a continuation of method 200a. In some implementations, method 200b includes obtaining zinc oxide quantum dots (for example, formed by implementation of method 200a). The method 200b can be implemented at ambient temperature and pressure.

At step 208, CTAB is mixed with water to form a micelle solution. For example, 0.1 grams (g) of CTAB can be dissolved in 5 mL of de-ionized water with the aid of a mechanical stirrer. CTAB, which is a cationic surfactant, can be used as a structure-directing agent to produce ordered mesoporous silica nanoparticles (also referred to as Mobil Composition of Matter Number 41 (MCM-41) type silica). This type of silica can be easily functionalized for various applications due to its uniform pore structure and size.

At step 210, a colloidal dispersion of zinc oxide quantum dots in ethanol (for example, formed from implementation of method 200*a*) is mixed with the micelle solution to form a second mixture. For example, 500 microliters (μL) of the colloidal dispersion can be added to the micelle solution under constant stirring at 250 rpm for about 10 minutes.

At step 212, the second mixture is mixed with a solution that includes sodium hydroxide to form a third mixture. For example, the second mixture can be added to 40 mL of a 13 millimolar (mM) solution of sodium hydroxide to form the third mixture.

At step 214, the third mixture is mixed with ethyl acetate to form a fourth mixture. For example, 3 mL of ethyl acetate can be added as a co-solvent to the third mixture to form the fourth mixture.

At step 216, the fourth mixture is mixed with TEOS, DIVIDES, or a combination of both to form a fifth mixture. For example, 250 μL of TEOS can be added to the fourth mixture to form the fifth mixture. For example, 250 μL of TEOS and 200 μL of DMDES can be added to the fourth mixture to form the fifth mixture.

At step 218, the fifth mixture is stirred to form silica nanoparticles embedded with zinc oxide quantum dots. For example, the fifth mixture can be stirred at 250 rpm for about 2 hours. For example, the fifth mixture can be stirred for about 12 hours. Adding only TEOS at step 216 can result in hydrophilic silica nanoparticles embedded with zinc oxide quantum dots at step 218. Adding both TEOS and DIVIDES at step 216 can result in methyl groups being disposed on the surfaces of the silica nanoparticles. The presence of the methyl groups can impart partial hydrophobicity in the silica nanoparticles formed at step 218. In some implementations, the silica nanoparticles formed at step 218 have diameters of less than about 100 nm. In some implementations, the silica nanoparticles formed at step 218 have diameters in a range of from about 40 nm to about 60 nm.

In the synthesis of the silica nanoparticles, ethyl acetate (introduced at step 214) can hydrolyze to alcohol and acetate in the presence of a base, whereas ion-pair formation between CTAB (which is positively charged) and acetate (which is negatively charged) would typically be expected to increase the surface curvature and reduce the interfacial tension in the fifth mixture to produce spherical templates for the nanoparticles.

In some implementations, the silica nanoparticles formed at step 218 are washed and separated from a remaining portion of the fifth mixture. For example, the fifth mixture (after step 218) can be washed and centrifuged sequentially with de-ionized water and ethanol to remove surfactant (CTAB). The silica nanoparticles embedded with zinc oxide quantum dots can be re-dispersed in a continuous phase for storage. The continuous phase can include ethanol or water.

Figure 2C:
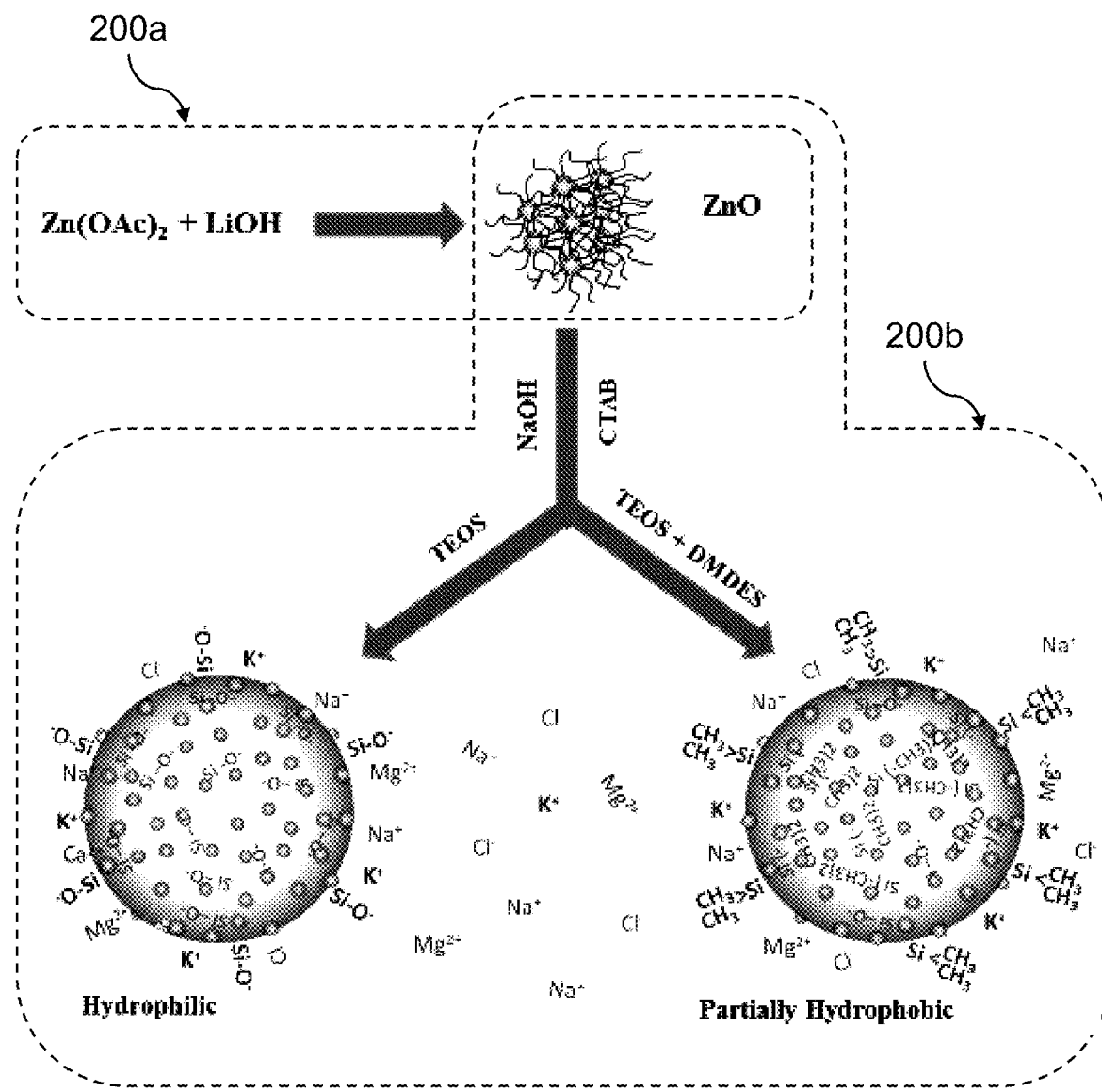
FIG. 2C is a schematic diagram illustrating the methods of FIGS. 2A and 2B.

FIG. 2C is a schematic diagram illustrating the methods 200*a* and 200*b*. In the diagram shown in FIG. 2C, the hydrophilic silica nanoparticle and the hydrophobic silica nanoparticle is shown in the presence of salt ions.

Figure 3:
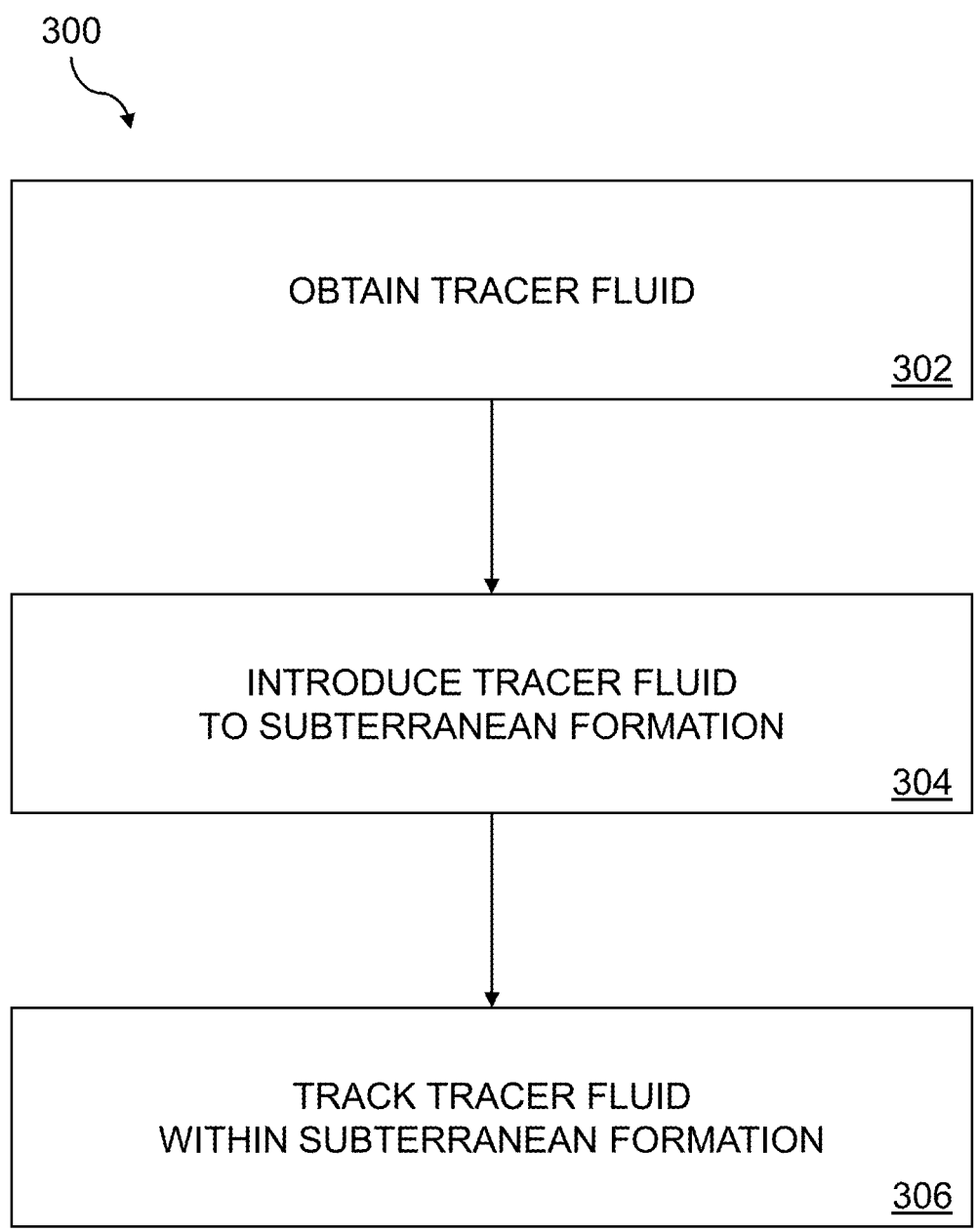
FIG. 3 is a flow chart of an example method for using silica nanoparticles embedded with zinc oxide quantum dots.

FIG. 3 is a flow chart of an example method 300 for using silica nanoparticles embedded with zinc oxide quantum dots (for example, formed by implementation of method 200*b*). At step 302, a tracer fluid is obtained. The tracer fluid includes a silica nanoparticle having a diameter of less than about 100 nanometers. In some implementations, the silica nanoparticle has a diameter in a range of from about 40 nm to about 60 nm. The tracer fluid includes methyl groups that are disposed on a surface of the silica nanoparticle. The tracer fluid includes a quantum dot including zinc oxide. The quantum dot is embedded in the silica nanoparticle. For example, the tracer fluid includes the silica nanoparticles embedded with zinc oxide quantum dots formed by implementation of method 200*b*. The tracer fluid can include a continuous phase that includes ethanol or water.

At step 304, the tracer fluid is introduced to a subterranean formation (for example, the subterranean zone 110). For example, the tracer fluid can be injected into the well 100 installed in a wellbore formed in the subterranean zone 110 at step 304.

At step 306, the tracer fluid is tracked within the subterranean formation. Tracking the tracer fluid at step 306 can include measuring a luminescence of the quantum dot that is embedded in the silica nanoparticle while the tracer fluid is within the subterranean formation.

Material Characterization

The morphology and size of the zinc oxide quantum dots were analyzed by a transmission electron microscope (TEM) (JEOL, JEM-2100F, Japan) as well as a high-resolution transmission electron microscope (HRTEM) (FEI Titan 3, USA). The samples were prepared by putting a dilute suspension of as-synthesized nanoparticles on a carbon-coated copper grid at room temperature. For cryo-TEM, the samples were vitrified and analyzed under cryogenic conditions by using liquid ethane. Additionally, the silica nanoparticles embedded with zinc oxide quantum dots were examined using a field-emission scanning electron microscope (FESEM) (TESCAN Lyra-3, Czech Republic). The samples were prepared by drying a diluted drop of suspension on copper tape followed by gold coating using a Quorum turbo-pumped sputter coater (Q150T, Quorum Technologies, UK). An energy-dispersive X-ray spectroscopic detector coupled with a scanning electron microscope (SEM) was used to attain the qualitative or semi-quantitative analysis of the synthesized materials.

Figure 4:
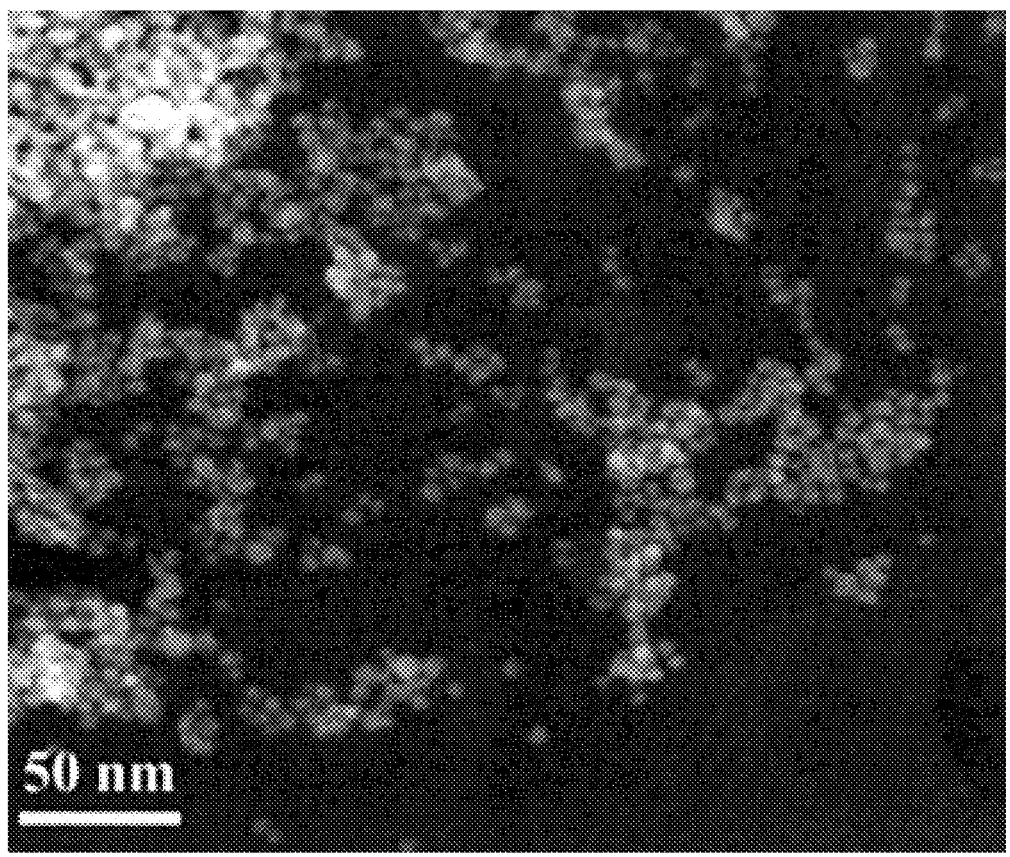
FIG. 4 is a cryogenic transmission electron microscope (cryo-TEM) image of zinc oxide quantum dots.

FIG. 4 is a cryogenic transmission electron microscope (cryo-TEM) image of zinc oxide quantum dots. The zinc oxide quantum dots had an average diameter of about 5 nm and had substantially spherical shapes. The vitrified zinc oxide quantum dots in the cryo-TEM image appear to be well-dispersed in ethanol. Adequate dispersion of the quantum dots in the continuous phase can facilitate uniform embedding of the zinc oxide quantum dots in the silica nanoparticles.

Figure 5A:
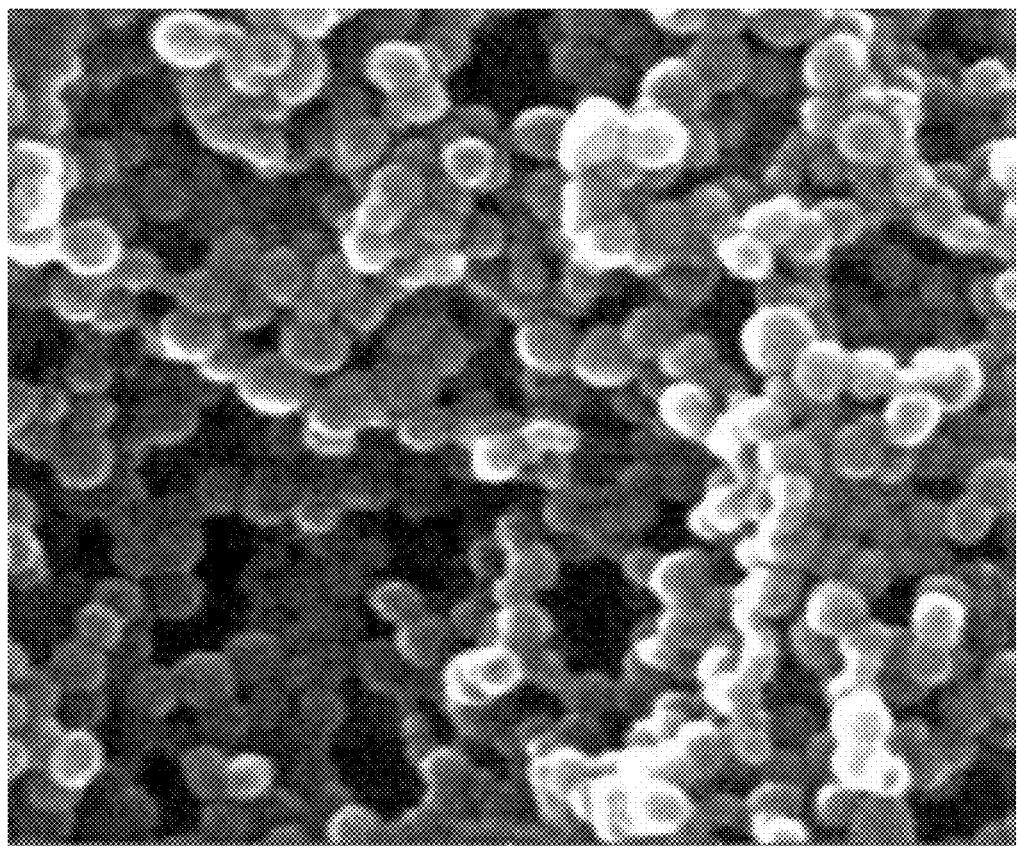
FIG. 5A is a field emission scanning electron microscope (FESEM) image of hydrophilic silica nanoparticles embedded with zinc oxide quantum dots.
Figure 5B:
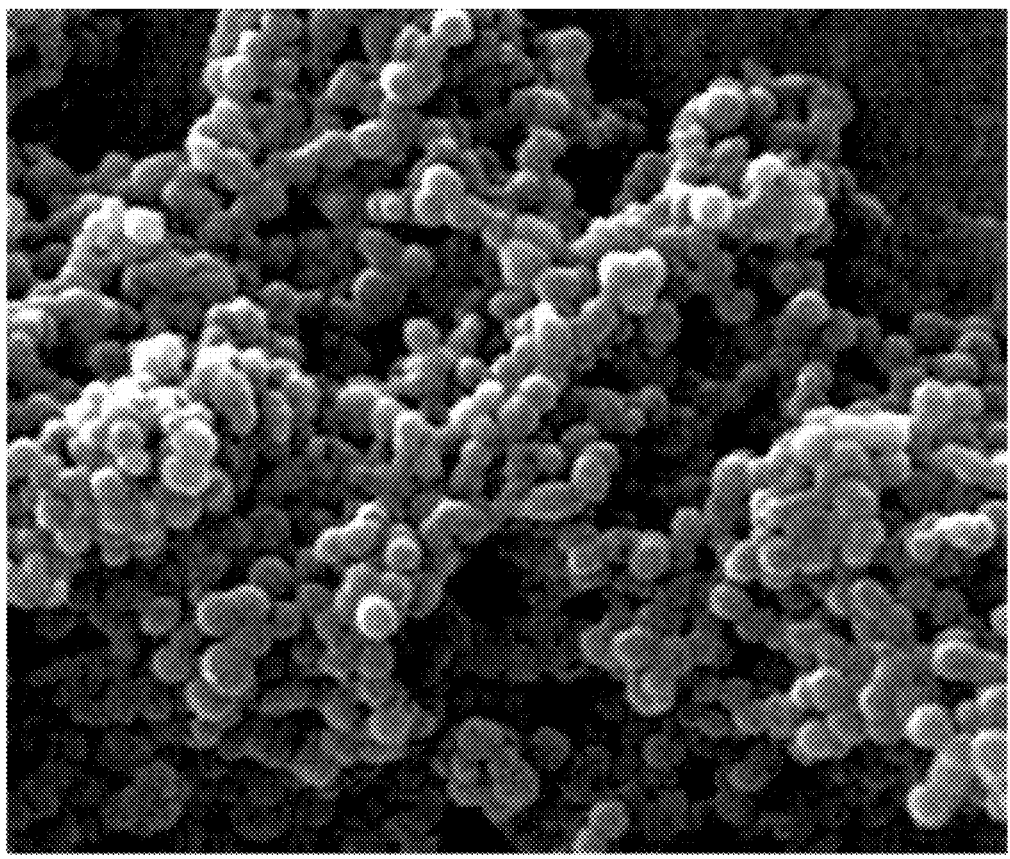
FIG. 5B is an FESEM image of partially hydrophobic silica nanoparticles embedded with zinc oxide quantum dots.

FIG. 5A is an FESEM image of hydrophilic silica nanoparticles embedded with zinc oxide quantum dots. FIG. 5B is an FESEM image of partially hydrophobic silica nanoparticles embedded with zinc oxide quantum dots. Both the hydrophilic silica nanoparticles shown in FIG. 5A and the partially hydrophobic silica nanoparticles shown in FIG. 5B had diameters in a range of from 40 nm to 60 nm and had substantially spherical shapes.

Figure 5C:
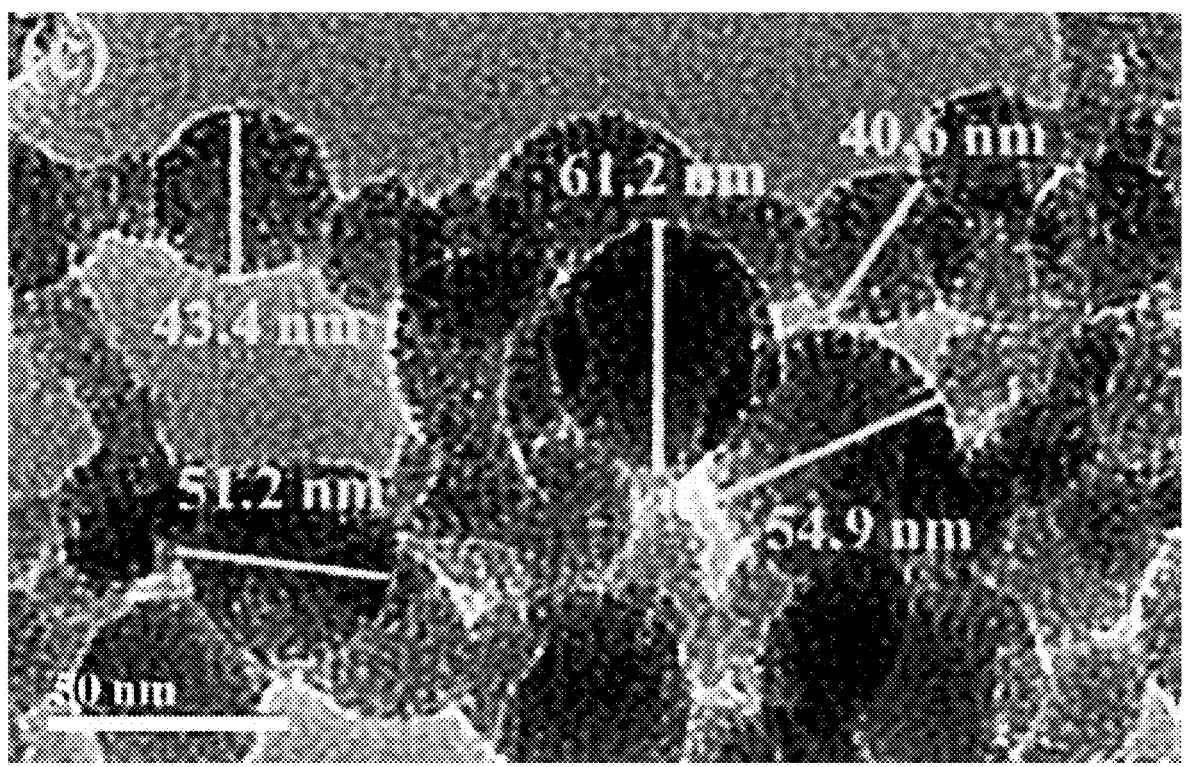
FIG. 5C is a high resolution transmission electron microscope (HRTEM) image of silica nanoparticles embedded with zinc oxide quantum dots.
Figure 5D:
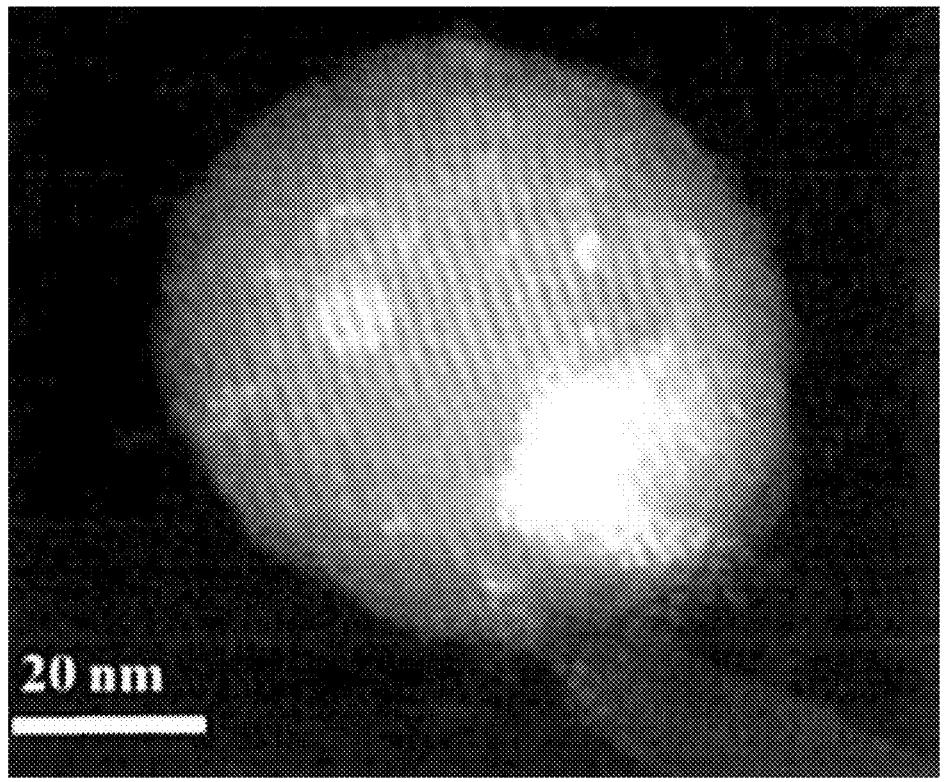
FIG. 5D is a cryo-TEM image of silica nanoparticles embedded with zinc oxide quantum dots.

FIG. 5C is an HRTEM image of silica nanoparticles embedded with zinc oxide quantum dots. The zinc oxide quantum dots embedded in the silica nanoparticles appear as dark dots. FIG. 5D is a cryo-TEM image of silica nanoparticles embedded with zinc oxide quantum dots. The ordered mesoporous structure of the silica nanoparticles appear as bright dots. The ordered mesoporous silica pores had a regular hexagonal shape with an average diameter of about 2 nm. The lattice fringes of the zinc oxide quantum dots were difficult to detect, due to the covering layers of silica. The presence of zinc and silicon in each of the hydrophilic and partially hydrophobic silica nanoparticles including zinc oxide quantum dots were verified using energy-dispersive X-ray (EDX) spectroscopy.

Photoluminescence Experiments

The fluorescence images of dried zinc oxide quantum dots and silica nanoparticles embedded with zinc oxide quantum dots were recorded using a fluorescent optical microscope (Eclipse Ti, Nikon) equipped with a mercury lamp as an ultraviolet light source. The chemical stability of zinc oxide quantum dots was investigated in ethanol under normal light and ultraviolet light illumination. It was observed that the synthesized zinc oxide quantum dots remained dispersed in ethanol and did not exhibit any visible sedimentation. The dispersed zinc oxide quantum dots produced bright green to yellow fluorescence under ultraviolet light illumination (wavelength of about 350 nm).

Figure 6A:
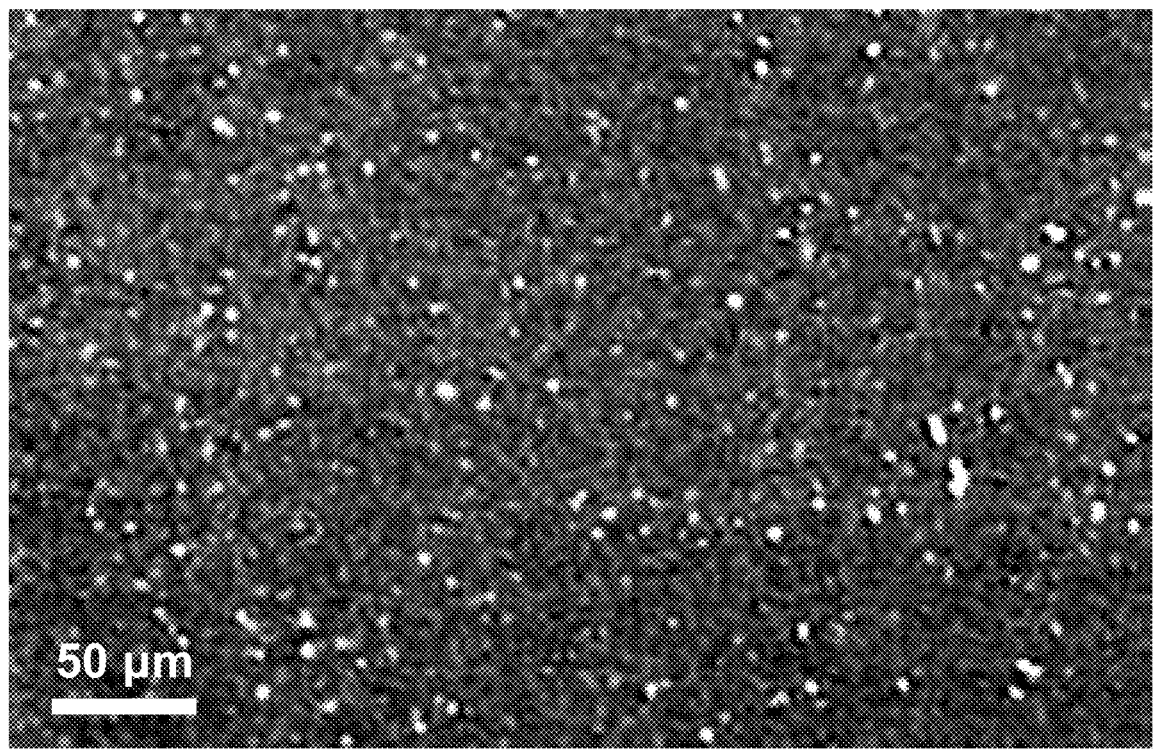
FIG. 6A is a fluorescence optical micrograph of zinc oxide quantum dots.
Figure 6B:
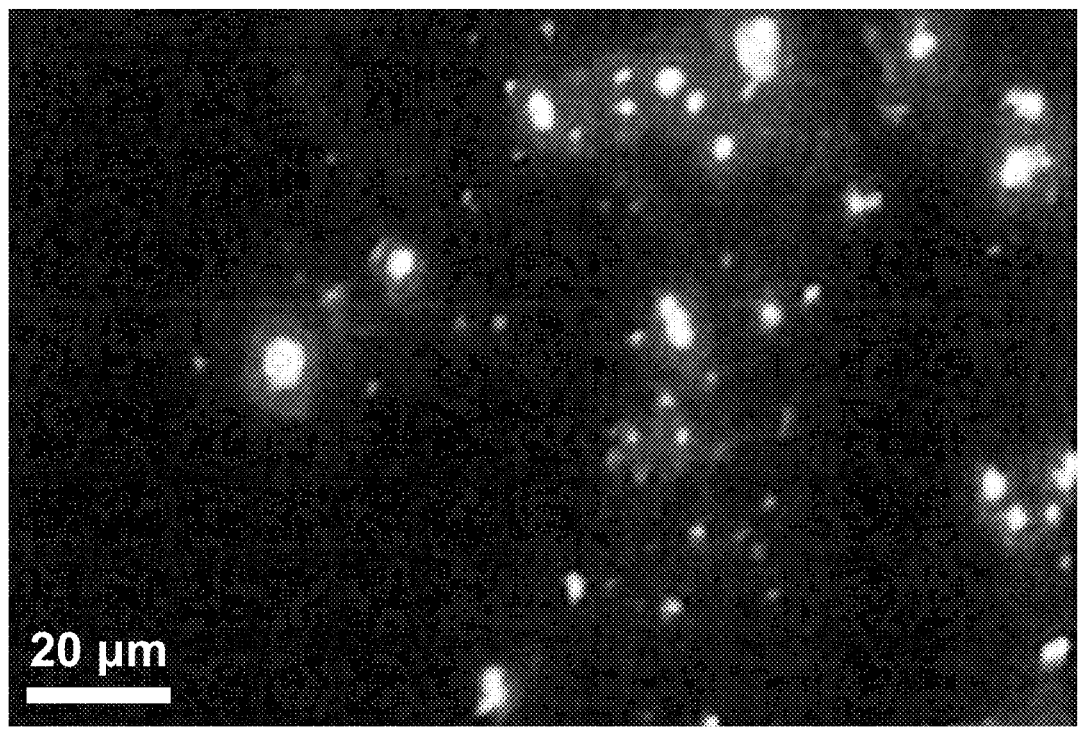
FIG. 6B is a fluorescence optical micrograph of zinc oxide quantum dots.

FIGS. 6A and 6B are fluorescence optical micrographs of zinc oxide quantum dots at different scales. After evaporation of the ethanol, the zinc oxide quantum dots settled to the bottom of the observation dish and continued to fluoresce, as shown in FIGS. 6A and 6B. The fluorescence stability of the silica nanoparticles including zinc oxide quantum dots was also examined under normal light and ultraviolet light. The silica nanoparticles including zinc oxide quantum dots produced luminescence characteristics under ultraviolet light similar to the fluorescence optical micrographs shown in FIGS. 6A and 6B.

The photoluminescence stabilities of as-synthesized zinc oxide quantum dots and silica nanoparticles embedded with zinc oxide quantum dots were analyzed in various solvents using a spectrofluorometer (Fluorolog-3, Horiba). Hellma quartz Suprasil® cuvettes having 10×10 millimeter pathlength were used, and the characteristic spectra (excitation and emission) were recorded.

Figure 7:
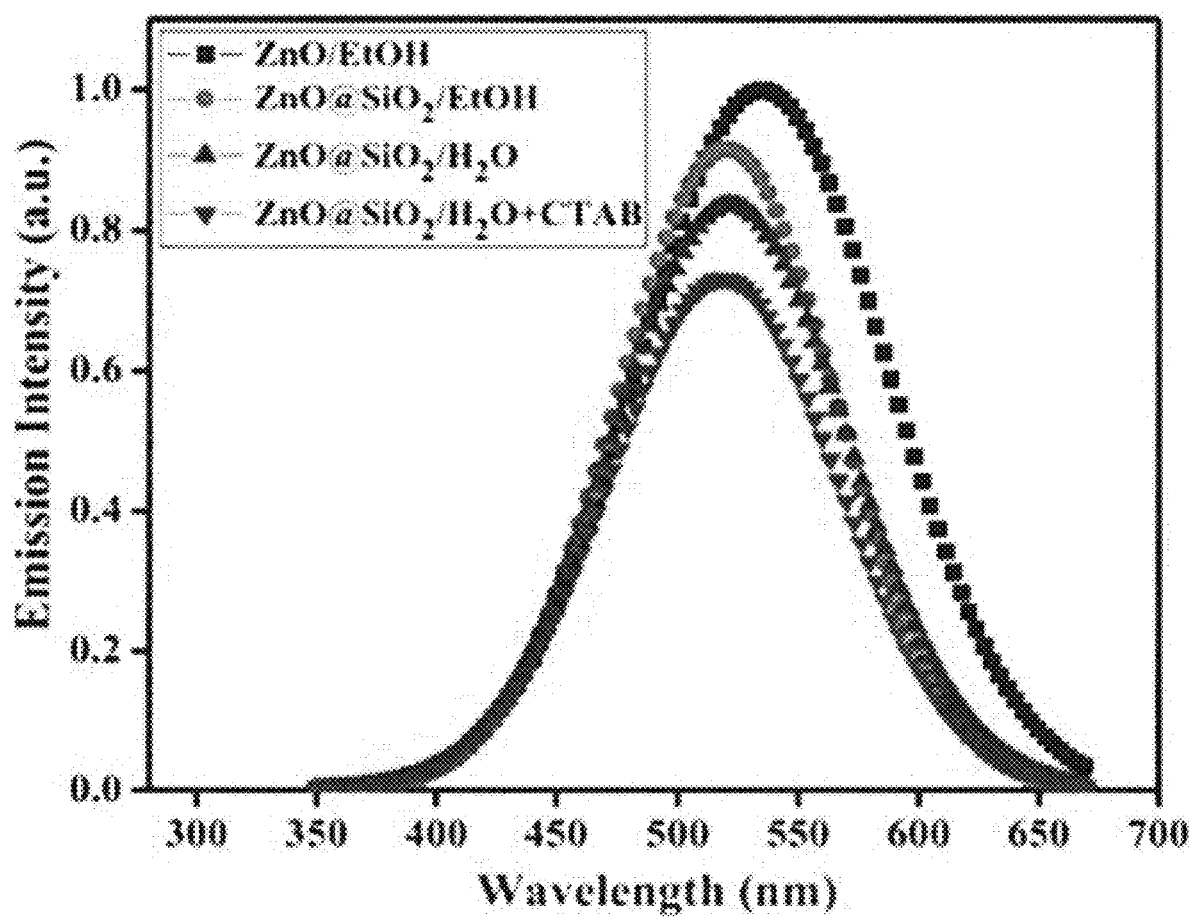
FIG. 7 is a plot of photoluminescence spectra of silica nanoparticles embedded with zinc oxide quantum dots in various solvents.

A comparative photoluminescence emission spectra of zinc oxide quantum dots in ethanol, hydrophilic silica nanoparticles including zinc oxide quantum dots in ethanol, hydrophilic silica nanoparticles including zinc oxide quantum dots in water, and hydrophilic silica nanoparticles including zinc oxide quantum dots in a mixture of water and cetyltrimethylammonium bromide (CTAB) are provided in FIG. 7. The emission spectrum of zinc oxide quantum dots in ethanol exhibited the highest intensity at a wavelength of 535 nm, whereas the emission wavelength region had a broad-band between 450 nm and 650 nm (in agreement with the green to yellow fluorescence region).

The emission spectrum of hydrophilic silica nanoparticles including zinc oxide quantum dots in ethanol exhibited the highest intensity at a wavelength of 520 nm and an 8% decrease in intensity in comparison to that of the zinc oxide quantum dots. This reduction in emission intensity may be attributed to the absorption of photons by silica layers.

A further 9% reduction in emission intensity was observed for the hydrophilic silica nanoparticles including zinc oxide quantum dots in water in comparison to those in ethanol. This reduction in emission intensity may be attributed to the instability of the portion of zinc oxide quantum dots that remained on the surface of the silica nanoparticles (rather than being embedded in the silica nanoparticles) and therefore exposed to the water environment which quenched the fluorescence of the zinc oxide quantum dots. It is noted that maintaining the hydrophilic silica nanoparticles including zinc oxide quantum dots in water for a month did not lead to any further decrease in emission intensity.

The utilization of CTAB surfactant improved the dispersion stability of the synthesized silica nanoparticles. However, the presence of CTAB appeared to have reduced the emission intensity.

Embedding the zinc oxide quantum dots in the silica nanoparticles resulted in a blue shift in emission (a shift of about 15 nm to greater energies) in comparison to the zinc oxide quantum dots by themselves. This shift may be attributed to the quantum confinement and electron transfer effects between the zinc oxide quantum dots, between the zinc oxide quantum dots and silica, or both. Similarly, the excitation spectrum of zinc oxide quantum dots in ethanol exhibited a maximum emission at a wavelength of 346 nm, whereas the excitation spectrum of the hydrophilic silica nanoparticles including zinc oxide quantum dots in water exhibited a maximum emission at a wavelength of 338 nm. A blue shift observed in the excitation wavelength of about 8 nm to greater energies may be attributed to the embedding of zinc oxide quantum dots in the silica nanoparticles.

The fluorescence stability in terms of emission intensity for both kinds of silica nanoparticles embedded with zinc oxide quantum dots—that is, synthesized with TEOS alone for the hydrophilic silica nanoparticles and synthesized with the co-condensation of TEOS and DMDES for the partially hydrophobic silica nanoparticles—was evaluated at a salinity and temperature to mimic reservoir conditions.

The effects of temperature and salinity were investigated on the emission stability of both hydrophilic and partially hydrophobic silica nanoparticles (including zinc oxide quantum dots). For each test, 10 mL of the sample were added to a pressure glass tube and left in an oven at a certain temperature or exposed to a specific salt concentration for 24 hours. Photoluminescence was recorded periodically for original synthesis throughout the testing to ensure that emission stability in water was not affected.

Figure 8A:
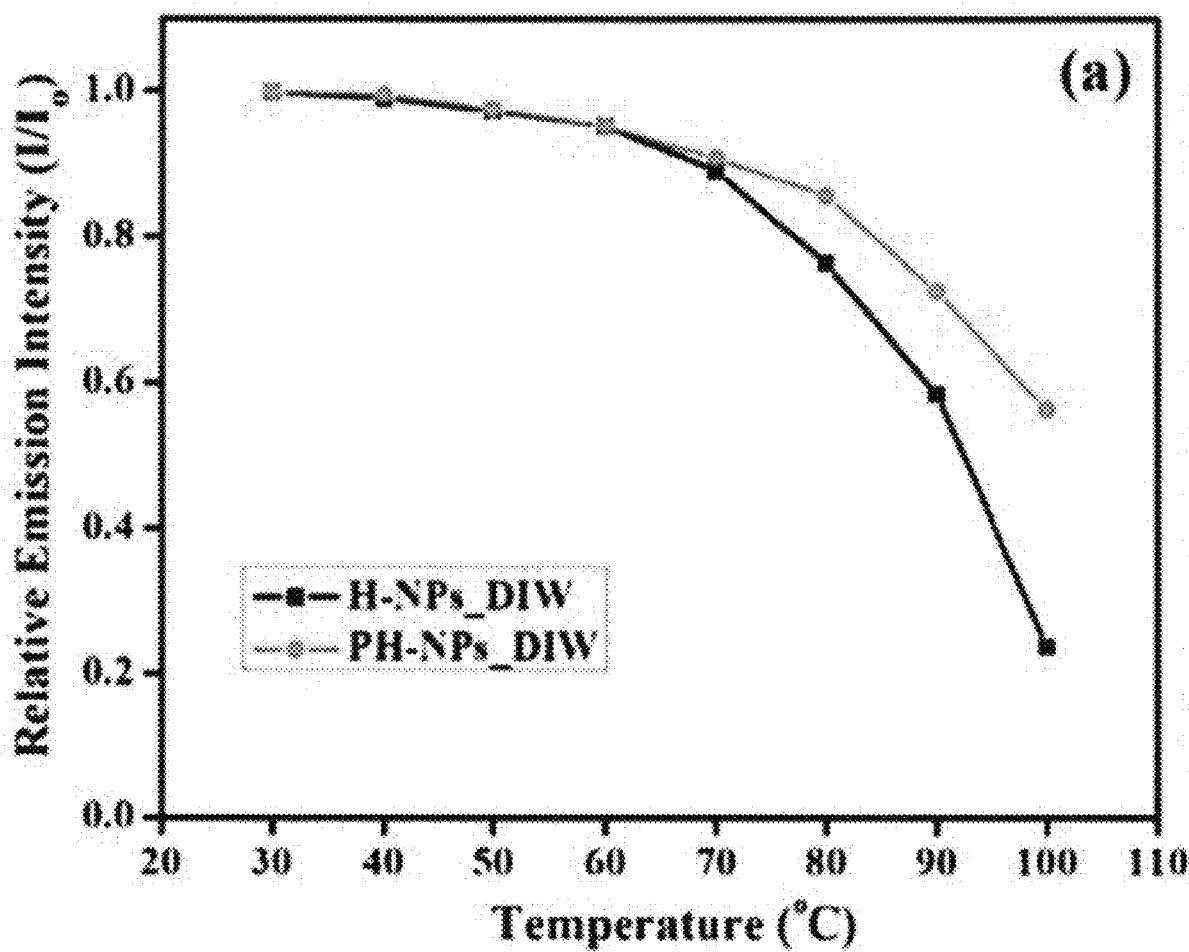
FIG. 8A is a plot comparing relative emission intensities of hydrophilic and partially hydrophobic nanoparticles in de-ionized water at various temperatures.

The effect of temperature was investigated on the emission stability of both hydrophilic and partially hydrophobic silica nanoparticles (including zinc oxide quantum dots) in de-ionized water at various temperatures ranging from 30° C. to 100° C. for 24 hours. FIG. 8A is a plot comparing relative emission intensities of hydrophilic and partially hydrophobic nanoparticles in de-ionized water at the various temperatures. The samples were cooled to room temperature before the fluorescence measurements. Relative emission intensity (REI) was calculated by dividing the values of emission intensity after exposure to heat or salinity (I) by values of emission intensity before exposure to heat or salinity (To). The comparison indicates that the REIs were nearly the same up to 70° C. for both types (hydrophilic and partially hydrophobic). The REI of the hydrophilic silica nanoparticles decreased to about 20% of its original value as temperature increased from 70° C. to 100° C., whereas the REI of the partially hydrophobic silica nanoparticles retained 55% of its original value at 100° C. This reduction of emission may be attributed to the agglomeration of the nanoparticles at increased temperature and pressure build-up in the sealed glass tubes which were used to incubate the samples.

Figure 8B:
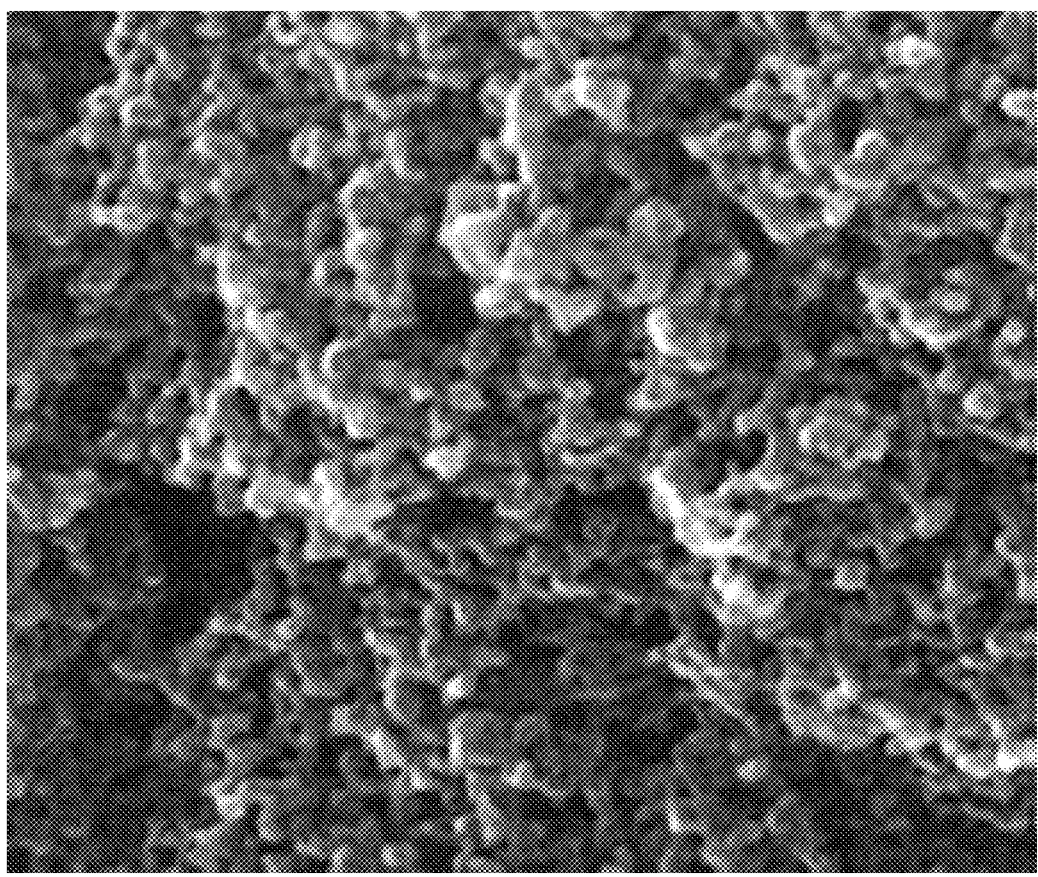
FIG. 8B is an FESEM image of hydrophilic nanoparticles before exposure to heat.
Figure 8C:
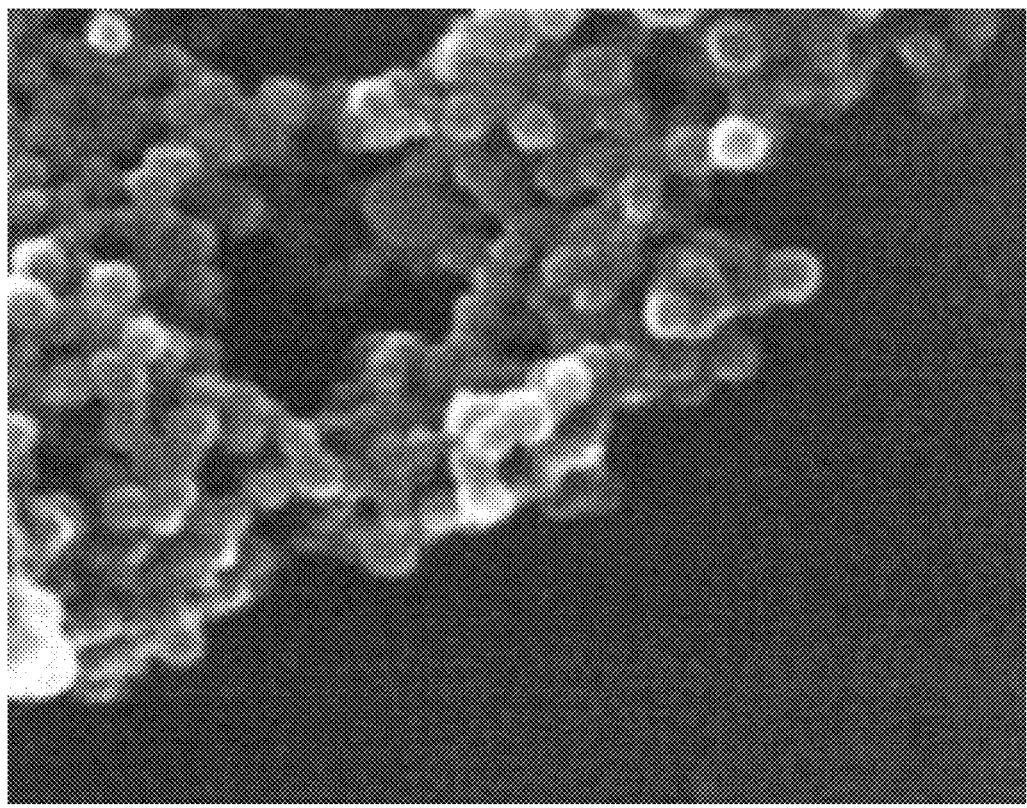
FIG. 8C is an FESEM image of the nanoparticles shown in FIG. 8B after exposure to 100° C. for 24 hours.
Figure 8D:
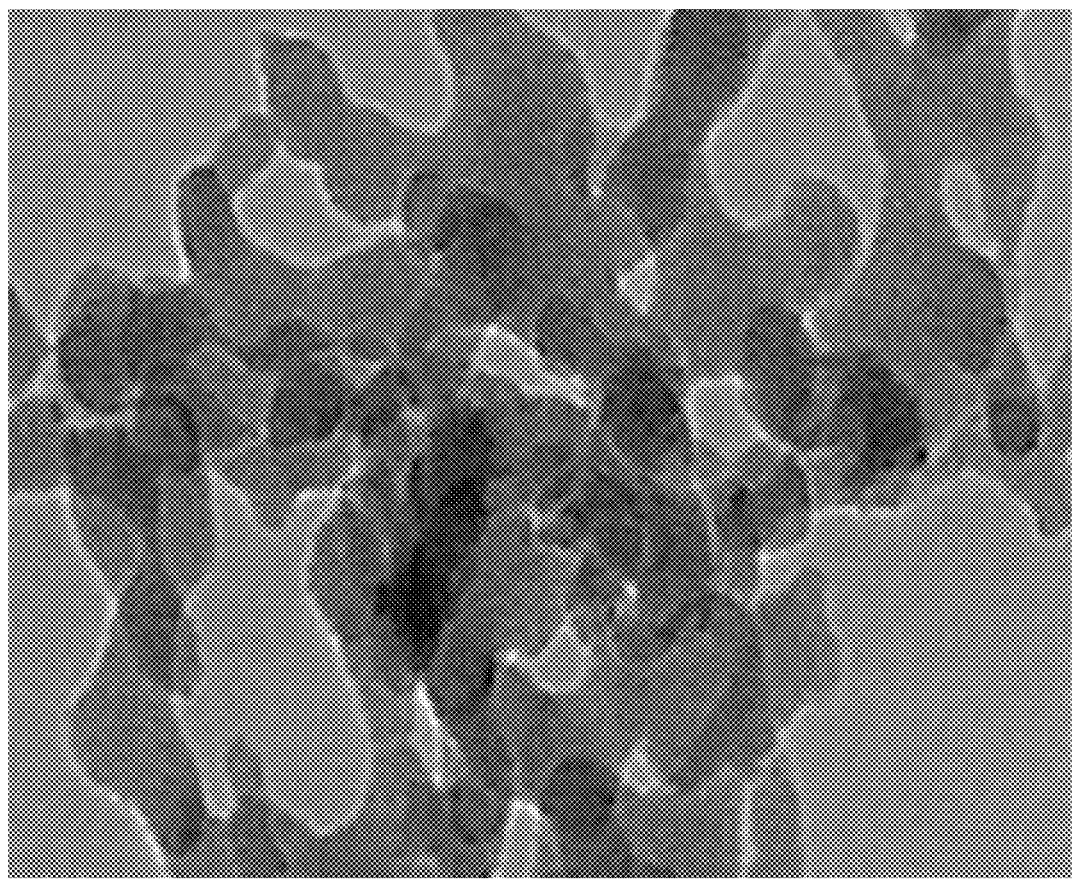
FIG. 8D is a transmission electron microscope (TEM) image of the nanoparticles shown in FIG. 8B after exposure to 100° C. for 24 hours.

FIG. 8B is an FESEM image of hydrophilic nanoparticles before exposure to heat. FIG. 8C is an FESEM image of the nanoparticles after exposure to 100° C. for 24 hours. FIG. 8D is a transmission electron microscope (TEM) image of the nanoparticles after exposure to 100° C. for 24 hours. Compared to the FESEM of the nanoparticles prior to heat exposure shown in FIG. 8B, agglomeration of the nanoparticles is observed in the FESEM and TEM images of the same sample after exposure to 100° C. for 24 hours shown in FIGS. 8C and 8D, respectively. The reduction of emission for both types of nanoparticles by increasing temperature and pressure may be attributed the dissolution of zinc oxide quantum dots by water molecules. The penetration of water molecules in the silica nanoparticles increases with increasing temperature, and water may access the zinc oxide quantum dots embedded in the silica nanoparticles. The penetration of water may be greater in the hydrophilic silica nanoparticles in comparison to the partially hydrophobic silica nanoparticles. Therefore, emission intensity may be more reduced for the hydrophilic silica nanoparticles in comparison to the partially hydrophobic silica nanoparticles.

The effect of salinity was investigated on the emission stability of both hydrophilic and partially hydrophobic silica nanoparticles (including zinc oxide quantum dots) in various concentrations (40 g/L, 20 g/L, 10 g/L, 5 g/L, and 0 g/L) of salinated water at about 30° C. The total salinity of the salinated water was about 80 g/L. The percentage compositions of salts in the salinated water were 60.7%, 26.07%, 0.24%, 9.39%, and 3.55% of sodium chloride (NaCl), magnesium chloride hexahydrate ($MgCl_2.6H_2O$), sodium bicarbonate ($NaHCO_3$), sodium sulfate ($Na_2SO_4$), and calcium chloride dihydrate ($CaCl_2.2H_2O$), respectively.

Figure 9A:
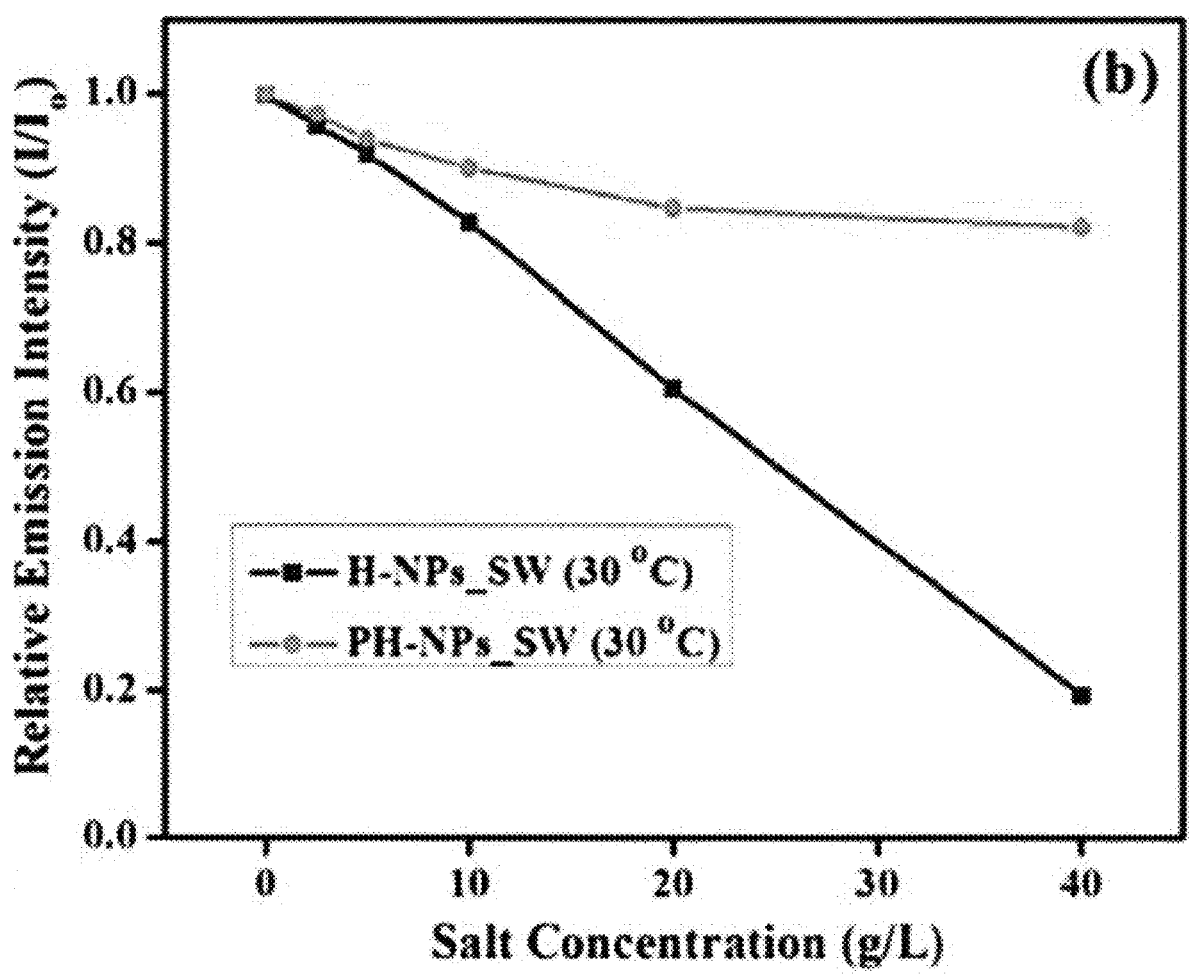
FIG. 9A is a plot comparing relative emission intensities of hydrophilic and partially hydrophobic nanoparticles in various salt concentrations at 30 degrees Celsius (° C.).

FIG. 9A is a plot comparing relative emission intensities of hydrophilic and partially hydrophobic nanoparticles at the various salt concentrations at about 30° C. The comparison of both samples shows that the REI was almost the same up to 5 g/L in salt concentration, whereas from 5 g/L to 40 g/L, the hydrophilic nanoparticles exhibited a greater reduction in fluorescence in comparison to the partially hydrophobic nanoparticles. The fluorescence of the partially hydrophobic nanoparticles was comparatively more stable in increased salinity, as they retained about 80% REI even in 40 g/L salt concentration.

The silica surfaces of the hydrophilic nanoparticles (produced from the condensation reaction of the TEOS precursor) are more hydrophilic in nature due to the O—and —OH terminal surface groups. Such terminal groups offer sites for hydrogen bonding between the silica surfaces and water molecules. In DMDES molecules, however, the two methyl (—$CH_3$) groups bonded to the silicon atom do not participate in the condensation reaction. Only the two ethoxy groups bonded to the silicon atom in DIVIDES molecules contribute to the condensation reaction. The presence of —$CH_3$ groups (which do not hydrogen bond with water) on the silica surfaces increases the hydrophobicity of the nanoparticles due to the reduced number of possible hydrogen bonding sites. Furthermore, developing the partially hydrophobic surface to protect the fluorescent markers (zinc oxide quantum dots) can be advantageous to other approaches of dispersing nanoparticles or covalently attaching polyelectrolytes, such as polyacrylic acid, polyvinyl pyridine, polystyrene sulfonate, or 2-acrylamido-2-methylpropane sulfonic acid, which either offers only moderate stability for harsh reservoir conditions or typically fails when exposed to divalent cations such as calcium ions and magnesium ions.

Figure 9B:
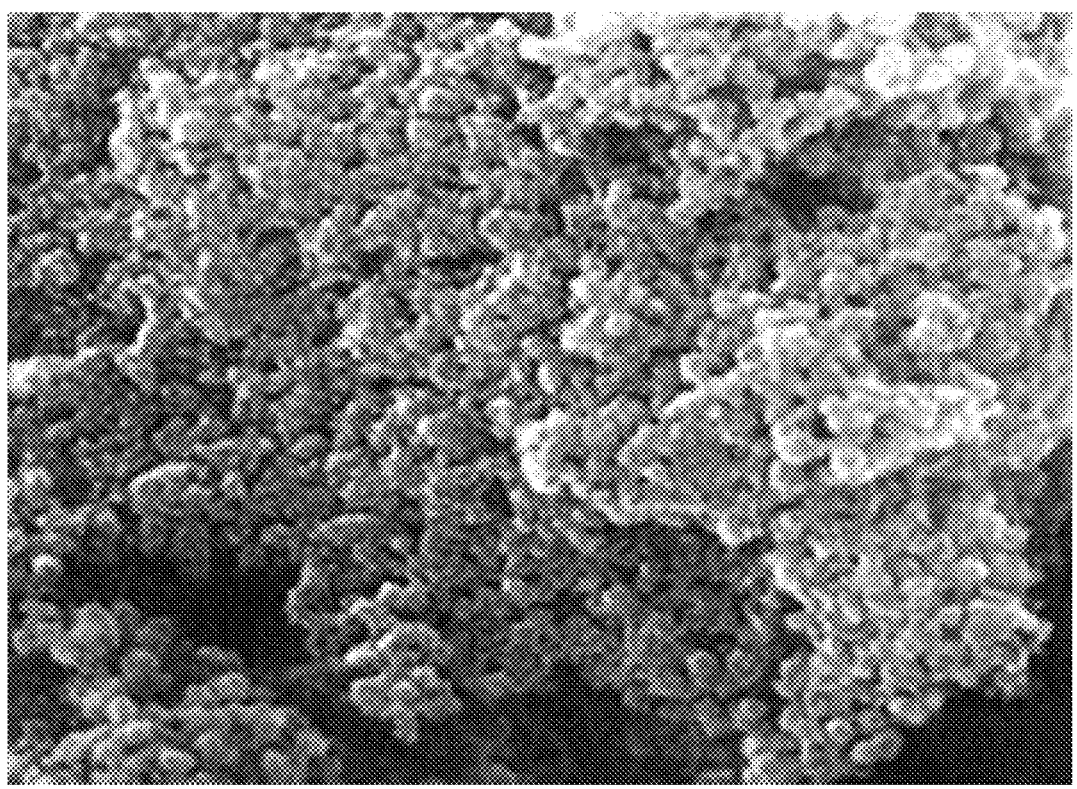
FIG. 9B is an FESEM image of hydrophilic nanoparticles after exposure to salinated water at 100° C. for 24 hours.
Figure 9C:
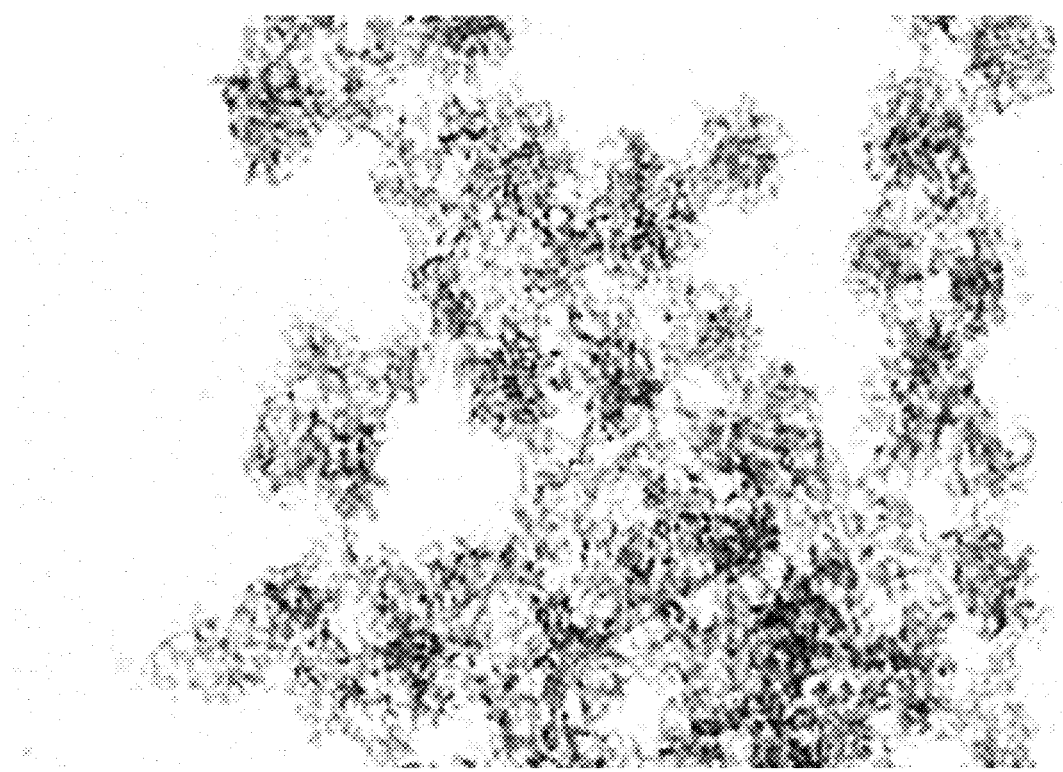
FIG. 9C is a TEM image of hydrophilic nanoparticles after exposure to salinated water at 100° C. for 24 hours.

The surface morphologies of the hydrophilic nanoparticles were also examined after salinity treatments. FIG. 9B is an FESEM image of the hydrophilic nanoparticles after exposure to the salinated water at 100° C. for 24 hours. FIG. 9C is a TEM image of the hydrophilic nanoparticles after exposure to the salinated water at 100° C. for 24 hours. The hydrophilic nanoparticles exhibited modified spherical surfaces, which may be attributed to deposited salts on the surfaces of the nanoparticles.

The decrease in emission intensity of the hydrophilic nanoparticles may be attributed to the attachment of positively charged salt ions to the negative charges on the hydrophilic silica surfaces. The relatively increased stability of the partially hydrophobic nanoparticles may be attributed to a reduced negative charge on the silica surfaces by creating Si(—$CH_3)_2$ instead of Si—$O^-$ groups. In turn, this difference leads to a decrease in the availability of sites upon which positive ions can attach.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method, comprising:
    dissolving zinc acetate dihydrate in ethanol to form a first solution;
    mixing lithium hydroxide with the first solution to form a first mixture;
    stirring the first mixture to form zinc oxide quantum dots, wherein the first mixture comprising the zinc oxide quantum dots has a potential of hydrogen (pH) in a range of from about 8 to about 9;
    separating the zinc oxide quantum dots from a remaining portion of the first mixture; and
    dispersing the zinc oxide quantum dots in ethanol to form a first colloidal dispersion.

2. The method of claim 1, comprising:
    mixing cetyltrimethylammonium bromide with water to form a micelle solution;
    mixing the first colloidal dispersion with the micelle solution to form a second mixture;
    mixing the second mixture with a solution comprising sodium hydroxide to form a third mixture;
    mixing the third mixture with ethyl acetate to form a fourth mixture;
    mixing the fourth mixture with tetraethylorthosilicate, dimethyldiethoxysilane, or a combination of both to form a fifth mixture; and
    stirring the fifth mixture to form silica nanoparticles embedded with zinc oxide quantum dots.

3. The method of claim 2, comprising:
    separating the silica nanoparticles from a remaining portion of the fifth mixture; and
    dispersing the silica nanoparticles in a continuous phase comprising ethanol or water to form a second colloidal dispersion.

4. The method of claim 2, wherein mixing cetyltrimethylammonium bromide with water comprises dissolving the cetyltrimethylammonium bromide in water while stirring.

5. The method of claim 2, wherein mixing the first colloidal dispersion with the micelle solution comprises mixing the first colloidal dispersion with the micelle solution while stirring, and the second mixture is stirred for about 10 minutes.

6. The method of claim 2, wherein the solution comprising sodium hydroxide has a sodium hydroxide concentration of about 13 millimoles per liter.

7. The method of claim 2, wherein mixing the fourth mixture with tetraethylorthosilicate, dimethyldiethoxysilane, or a combination of both comprises mixing the fourth mixture with tetraethylorthosilicate and dimethyldiethoxysilane while stirring, and the fifth mixture is stirred for about 12 hours.

8. The method of claim 7, wherein a molar ratio of tetraethylorthosilicate to dimethyldiethoxysilane that is mixed with the fourth mixture is about 1:2.

9. The method of claim 1, wherein the first mixture is diluted with ethanol before the first mixture is stirred.

10. The method of claim 1, wherein the first mixture is stirred for about 2 hours.

11. The method of claim 1, wherein separating the formed zinc oxide quantum dots from the remaining portion of the first mixture comprises centrifuging the first mixture.

12. A method, comprising:
    obtaining a tracer fluid by the method of claim 1, wherein the tracer fluid comprising:
        a silica nanoparticle having a diameter of less than 100 nanometers;
        a plurality of methyl groups disposed on a surface of the silica nanoparticle; and
        a quantum dot comprising zinc oxide, the quantum dot embedded in the silica nanoparticle;
    introducing the tracer fluid to a subterranean formation; and
    tracking the tracer fluid within the subterranean formation.

13. The method of claim 12, wherein tracking the tracer fluid comprises measuring a luminescence of the quantum dot embedded in the silica nanoparticle while the tracer fluid is within the subterranean formation.

14. The method of claim 12, wherein the silica nanoparticle is formed by the method of claim 2.

15. A composition prepared by the method of claim 1, comprising:
    a continuous phase comprising ethanol or water;
    a silica nanoparticle having a diameter of less than 100 nanometers;
    a plurality of methyl groups disposed on a surface of the silica nanoparticle; and
    a quantum dot comprising zinc oxide, the quantum dot embedded in the silica nanoparticle.

16. The composition of claim 15, comprising a plurality of silica nanoparticles, wherein:
    a plurality of methyl groups are disposed on a surface of each of the silica nanoparticles;
    a quantum dot comprising zinc oxide is embedded in each of the silica nanoparticles; and
    each of the silica nanoparticles have diameters in a range of from about 40 nanometers to about 60 nanometers.

* * * * *

UNITED STATES PATENT AND TRADEMARK OFFICE
CERTIFICATE OF CORRECTION

| | | |
|---|---|---|
| PATENT NO. | : 12,378,467 B2 | Page 1 of 1 |
| APPLICATION NO. | : 16/672478 | |
| DATED | : August 5, 2025 | |
| INVENTOR(S) | : Zain H. Yamani et al. | |

It is certified that error appears in the above-identified patent and that said Letters Patent is hereby corrected as shown below:

On the Title Page

Column 1, Item (71), Line 2, delete "Univerisity" insert --University--.

Signed and Sealed this
Seventh Day of October, 2025

John A. Squires
*Director of the United States Patent and Trademark Office*